US010018512B2

(12) United States Patent
Rouse

(10) Patent No.: US 10,018,512 B2
(45) Date of Patent: Jul. 10, 2018

(54) METHOD FOR PREVENTING CHAFFING BETWEEN A LINEAR DETECTOR CABLE AND A PROTECTIVE OUTER SHEATH

(71) Applicant: Kidde Technologies, Inc., Wilson, NC (US)

(72) Inventor: Chad Rouse, Wilson, NC (US)

(73) Assignee: Kidde Technologies, Inc., Wilson, NC (US)

( * ) Notice: Subject to any disclaimer, the term of this patent is extended or adjusted under 35 U.S.C. 154(b) by 190 days.

(21) Appl. No.: 15/016,393

(22) Filed: Feb. 5, 2016

(65) Prior Publication Data

US 2017/0227401 A1    Aug. 10, 2017

(51) Int. Cl.
| | | |
|---|---|---|
| *H01R 43/00* | (2006.01) | |
| *G01K 1/12* | (2006.01) | |
| *G01K 7/16* | (2006.01) | |
| *H01R 43/033* | (2006.01) | |
| *H01R 43/24* | (2006.01) | |

(52) U.S. Cl.
CPC ............. *G01K 1/12* (2013.01); *G01K 7/16* (2013.01); *H01R 43/033* (2013.01); *H01R 43/24* (2013.01)

(58) Field of Classification Search
CPC . G01K 1/12; G01K 7/16; H01R 43/24; H01R 43/28; H01R 43/033
See application file for complete search history.

(56) References Cited

U.S. PATENT DOCUMENTS

| | | | |
|---|---|---|---|
| 4,431,863 A | | 2/1984 | Metzler, Jr. |
| 4,867,269 A | * | 9/1989 | Lalikos .................. F01N 13/08 138/103 |
| 4,912,285 A | | 3/1990 | Falciglia |
| 5,098,319 A | * | 3/1992 | McGaffigan ......... B23K 3/0475 174/DIG. 8 |

(Continued)

FOREIGN PATENT DOCUMENTS

| | | |
|---|---|---|
| CN | 101260902 A | 9/2008 |
| CN | 201203925 Y | 3/2009 |

(Continued)

OTHER PUBLICATIONS

Extended European Search Report dated Apr. 10, 2017, issued during the prosecution of European Patent Application No. 17153966 (10 pages).

(Continued)

*Primary Examiner* — Paul D Kim
(74) *Attorney, Agent, or Firm* — Locke Lord LLP; Scott D. Wofsy; Joshua L. Jones

(57) ABSTRACT

A method for preventing chaffing between a linear detector cable and a protective outer sheath including the steps of preparing an elongated polymer tube having a predetermined length and outer diameter, wrapping heat resistant tape having a given width around a distal end portion of the tube to locally enlarge the outer diameter of the tube, and inserting a proximal end portion of the tube into an open end of a metallic protective sheath having a predetermined inner diameter that is slightly greater than or equal to the outer diameter of the tube, so that the heat resistant tape wrapped around the distal end portion of the tube abuts against the end of the sheath to acts as a stop surface.

17 Claims, 4 Drawing Sheets

(56) References Cited

U.S. PATENT DOCUMENTS

| | | | | |
|---|---|---|---|---|
| 5,163,856 A | * | 11/1992 | McGaffigan | B23K 3/0475 |
| | | | | 219/616 |
| 5,280,138 A | | 1/1994 | Preston et al. | |
| 5,381,511 A | * | 1/1995 | Bahar | F16L 11/12 |
| | | | | 138/104 |
| 5,499,528 A | * | 3/1996 | Bahar | B29C 47/0023 |
| | | | | 392/472 |
| 5,793,293 A | * | 8/1998 | Melamud | G01K 3/005 |
| | | | | 340/511 |
| 5,944,567 A | * | 8/1999 | Ratajczak | H01R 4/723 |
| | | | | 439/874 |
| 6,130,978 A | * | 10/2000 | Limbert | G02B 6/3887 |
| | | | | 385/81 |
| 6,454,598 B1 | * | 9/2002 | Burwell | H01R 4/726 |
| | | | | 174/84 C |
| 6,713,733 B2 | * | 3/2004 | Kochman | H05B 3/342 |
| | | | | 219/494 |
| 9,072,501 B2 | | 7/2015 | Menchaca et al. | |
| 9,157,564 B2 | | 10/2015 | Sellis et al. | |
| 9,184,517 B1 | * | 11/2015 | Endacott | H01R 4/183 |
| 9,827,122 B2 | * | 11/2017 | Le | A61F 2/95 |
| 2002/0164130 A1 | * | 11/2002 | Elkins, II | G02B 6/3887 |
| | | | | 385/87 |
| 2004/0262025 A1 | * | 12/2004 | Brandt | H02G 15/115 |
| | | | | 174/88 R |

FOREIGN PATENT DOCUMENTS

| | | |
|---|---|---|
| CN | 203871790 U | 10/2014 |
| GB | 1376119 A * | 4/1974 |
| JP | 2014023166 A | 2/2014 |
| NL | 1023812 C2 | 1/2005 |
| WO | WO-2015/005403 A1 | 1/2015 |

OTHER PUBLICATIONS

European Examination Report dated Apr. 3, 2018 issued during the prosecution of European Patent Application No. EP 17153966.1 (8 pages).

* cited by examiner

METHOD FOR PREVENTING CHAFFING BETWEEN A LINEAR DETECTOR CABLE AND A PROTECTIVE OUTER SHEATH

BACKGROUND OF THE INVENTION

1. Field of the Invention

The subject invention is directed to a method for preventing chaffing between a linear detector cable and a protective outer sheath in a terminal transition region, and more particularly, to a method of constructing a sheathed linear detection cable with transition protection to prevent chaffing.

2. Description of Related Art

Linear heat detection cables are commonly used for fire detection. They typically include a two-core cable terminated by an end-of-line resistor, the form of which varies by application. The two core wires are separated by a polymer plastic, that is designed to melt at a specific temperature, and without which causes the two core wires to short. This can be seen as a change in resistance in the wire, which can be detected anywhere along the length of the cable. Applications can range from building fire alarm systems to transportation systems.

In vehicular applications, these cables are often mounted within an engine compartment where they are subject to a harsh environment including intense radiant heat, sources of abrasion and constant vibration during vehicle operation. In view of the harsh environment, it is advantageous to cover the relatively delicate detection cable with protective sheathing, which can protect it against abrasion and reflect radiant heat.

For example, in certain applications, it has been found to be advantageous to protect the linear heat detection cable within a flexible stainless steel conduit. However, in such a configuration, there will be an unprotected portion of the detector cable that will extend from the open end of the conduit. That open end will typically have sharp surfaces, and these surfaces can potentially chaff the polymer covering of the detection cable, especially in an operating environment that experiences continuous vibrations. This could cause the core wires to short unnecessarily, rendering the linear detection cable inoperative.

It would be advantageous therefore, to provide a method for preventing chaffing between a linear detector cable and a protective outer sheath in a terminal transition region between the ends of the sheath and the connector component of the liner detector. The subject invention provides such a solution.

SUMMARY OF THE INVENTION

The subject invention is directed to a new and useful method for preventing chaffing between a linear detector cable and a protective outer sheath. The method includes the steps of preparing an elongated polymer tube having a predetermined length, wrapping heat resistant tape having a given width around a distal end portion of the polymer tube to locally enlarge the outer diameter of the tube, and then inserting a proximal end portion of the polymer tube into an open end of a metallic protective outer sheath, so that the heat resistant tape wrapped around the distal end portion of the tube abuts against the end of the protective sheath to acts as a stop surface. This will ensure that the tube is properly positioned within the sheath.

Preferably, the protective outer sheath has an inner diameter that is slightly greater than or equal to the outer diameter of the polymer tube. The step of wrapping heat resistant tape around a distal end portion of the polymer tube involves wrapping at least two layers of tape around the distal end of the tube. Preferably, the step of wrapping heat resistant tape around a distal end portion of the polymer tube involves wrapping tape having a width that is about one third of the length of the tube.

The method further includes the steps of feeding a linear detector cable into the protective sheath through the distal end portion of the polymer tube, and then installing a terminal connector to an end portion of the linear detector cable extending from the distal end portion of the polymer tube.

The method further includes the step of spirally wrapping a layer of heat resistant tape over an end portion of the protective outer sheath, the distal end portion of the tube and the linear detector cable, up to the back of the terminal connector, to define a transition area. The method also includes the steps of positioning a transition boot over the transition area delineated by the spirally wrapped tape, and then heat shrinking the transition boot over the transition area delineated by the spirally wrapped tape.

The subject invention is also directed to a method of constructing a sheathed linear detector cable with transition protection. The method includes the steps of providing an elongated metallic protective outer sheath having opposed open ends and a given inner diameter, providing a pair of elongated polymer tubes each having a given outer diameter that is slightly less than or equal to the inner diameter of the protective pouter sheath, forming a stop surface on a distal end portion each polymer tube, and positioning a proximal end portion of one of the polymer tube into each open end of the protective outer sheath, so that the stop surface on the tube abuts against the end of the protective sheath to ensure proper positioning of that tube within the sheath.

The method further includes the step of feeding a linear detector cable into the outer protective sheath through the distal end portion of one of the polymer tubes, and then installing a terminal connector to each of the end portions of the linear detector cable extending from the distal end portions of each of the polymer tubes.

The method also includes the step of spirally wrapping a layer of heat resistant tape over the end portion of the protective sheath, the distal end portion of the polymer tube and the portion of the linear detector cable extending from the tube, up to the back of the terminal connector, to define a transition area at each end of the protective sheath. A transition boot is then positioned over the transition areas delineated by the spirally wrapped tape at each end of the protective sheath, and the method then involves heat shrinking the transition boots over the transition areas at each end of the protective sheath.

These and other features of the subject invention and the manner in which it is employed will become more readily apparent to those having ordinary skill in the art from the following enabling description of the preferred embodiments of the subject invention taken in conjunction with the several drawings described below.

BRIEF DESCRIPTION OF THE DRAWINGS

So that those skilled in the art to which the subject invention appertains will readily understand how to make and use the sheathed linear detector cable of the subject invention without undue experimentation, preferred embodiments thereof will be described in detail herein below with reference to certain figures, wherein.

DETAILED DESCRIPTION OF PREFERRED EMBODIMENTS

Figure 1:
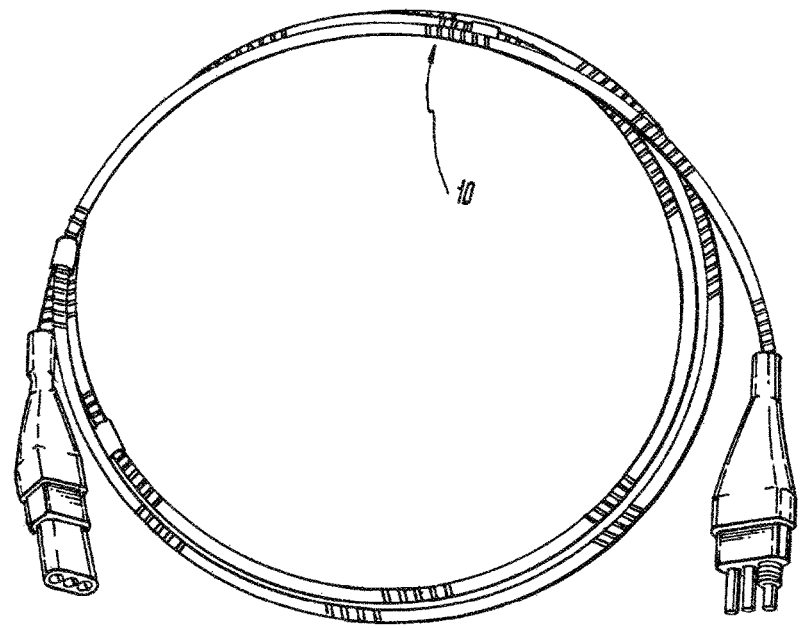
FIG. 1 is a sheathed linear detection cable assembly having transition protection, which is constructed in accordance with the method of the subject invention.

Referring now to the drawings wherein like reference numerals identify similar structural features and/or elements of the subject matter disclosed herein, there is illustrated in FIG. 1 a sheathed linear detection cable assembly having transition protection, which has been constructed in accordance with the method of the subject invention and is designated generally by reference numeral 10.

The sheathed linear detection cable assembly 10 of the subject invention is particularly well suited for use in vehicles and is designed to operate at temperatures up to 260° C. The construction method and the components of the cable assembly 10 will be described in detail below with respect to the drawings.

Figure 2:
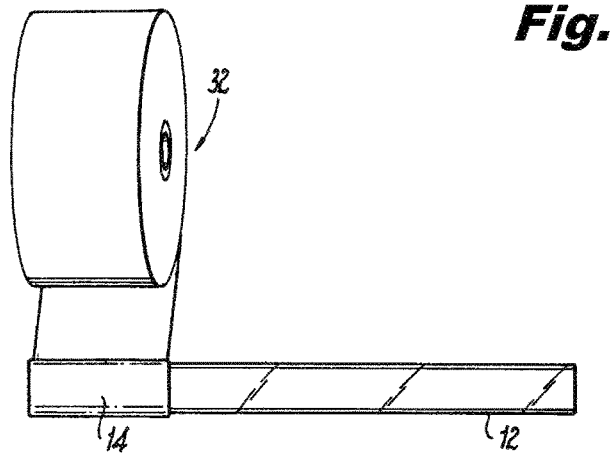
FIG. 2 is a polymer tube with a tape wrapped stop surface provided on a distal end portion thereof for forming the transition region of the detection cable assembly shown in FIG. 1.

Referring to FIG. 2, the construction method of the subject invention includes the initial step of preparing or otherwise cutting a pair of elongated polymer tubes 12 to a predetermined length "L." Preferably, the polymer tubes are formed from PTFE or a similar heat resistant polymer material that will not shrink and will provide a smooth and lubricous transition structure for the cable assembly 10. The polymer tubes 12 are preferably cut to lengths of about 2.50 inches+/−0.25 inches.

Then, heat resistant tape, having a given width "w" is wrapped around a distal end portion of each polymer tube 12 to locally enlarge the outer diameter of the tube. This forms a stop or abutment surface 14 on the distal end portion of each tube 12. Preferably, the step of wrapping heat resistant tape around the distal end portion of the polymer tube 12 to form a stop surface 14 involves wrapping at least two layers of tape around the distal end of the tube 12.

Preferably, the width "w" of the heat resistant tape and thus the stop surface 14 is equal to about one-third of the length "L" of the tube 12. Suitable heat resistant tape includes, for example, 3M Glass Cloth Tape 361 or 3M Glass Cloth Electrical Tape 69, which are both commercially available from 3M Corporation of St. Paul, Minn. These tapes have high temperature resistance, high adhesion and a very strong, abrasion resistant backing.

Figure 3:
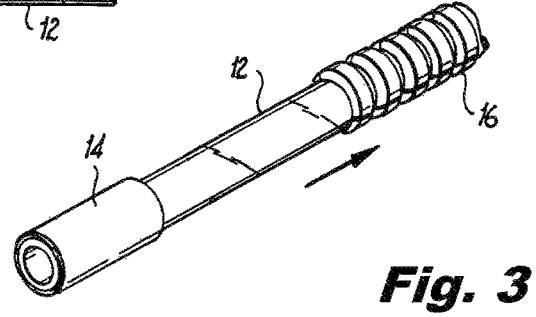
FIG. 3 illustrates the step of inserting the polymer tube with the tape wrapped stop surface shown in FIG. 2 into an open end of a flexible protective outer sheath, so that the stop surface abuts against the end of the protective outer sheath.
Figure 4:
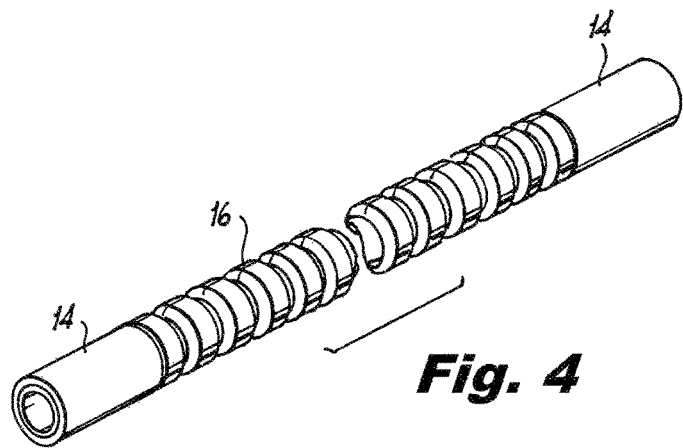
FIG. 4 illustrates the protective outer sheath with a polymer tube inserted into both ends thereof.

Once the polymer tubes 12 are completed, the proximal end portion of each tube 12 is inserted into an open end of a flexible protective outer sheath 16, as shown in FIG. 3, so that the stop surfaces 14 formed by the wrapped heat resistant tape abut against the ends of the protective outer sheath 16, as best seen in FIG. 4. This will ensure that the tubes 12 are properly positioned within the sheath 16.

Preferably, the protective outer sheath 16 is formed from corrugated stainless steel or a similar flexible conduit and it has an inner diameter that is slightly greater than or equal to the outer diameter of the polymer tubes 12. The metallic outer sheath 16 can vary in length depending upon the application in which it is intended to be used.

Figure 5:
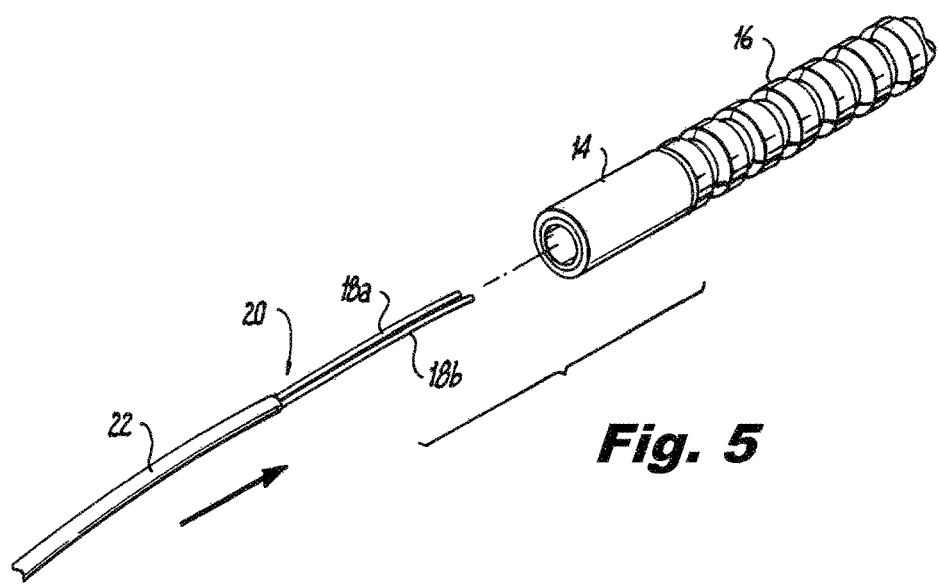
FIG. 5 shows the step of feeding a linear detector cable into the protective sheath through the distal end portion of a polymer tube.

The method of the subject invention further includes the step of feeding a linear detector cable 20 into the protective sheath 16 through the distal end portion of one of the polymer tubes 12, so that free end portion of the linear detector cable 20 extends from each end of the sheath 16, as illustrated in FIG. 5. The linear detector cable 20 is comprised of two polymer coated core conductor wires 18a, 18b enclosed in an outer covering 22. The polymer coating on the wires 18a, 18b of cable 20 is heat sensitive and designed to melt at a specific temperature, to effectuate a short indicating a fire along the length of the cable. Preferably, the cable 20 is positioned in the protective sheath 16 so that the outer insulation 22 stops just before the end of the tube 12.

Figure 6:
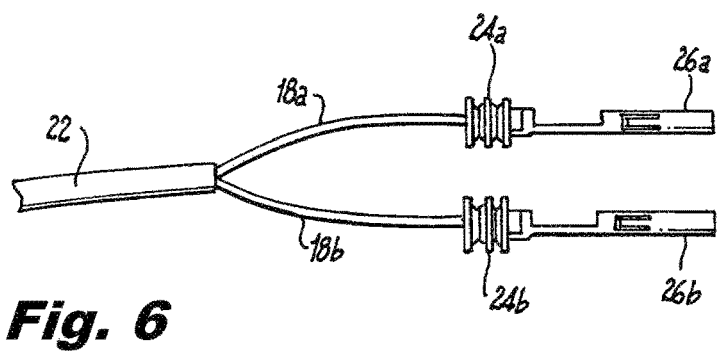
FIG. 6 shows a wire seal and terminal pin installed on the two core wires of the linear detection cable won in FIG. 5.

Once the linear detector cable 20 is fed through the sheath 16, the outer covering 22 is stripped away from each end of the cable to expose the two polymer coated core wires 18a, 18b. Then, the polymer coating is stripped from each wire 18a, 18b to expose about 0.25 inches of each core wire. A wire seal 24a, 24b and female terminal pin 26a, 26b is installed on both core wires 18a, 18b at each end of the cable, as shown in FIG. 6. The terminal pins 26a, 26b are preferably attached using a crimping tool or a similar joining technique. Thereafter, the bifurcated core wires 18a, 18b are bent so that the two terminal pins 26a, 26b are about 0.65 inches apart and there is about 0.25 inches of wire in alignment with each pin. The pins are then soldered to the wires per ANSI-IPC-A-610.

Figure 7:
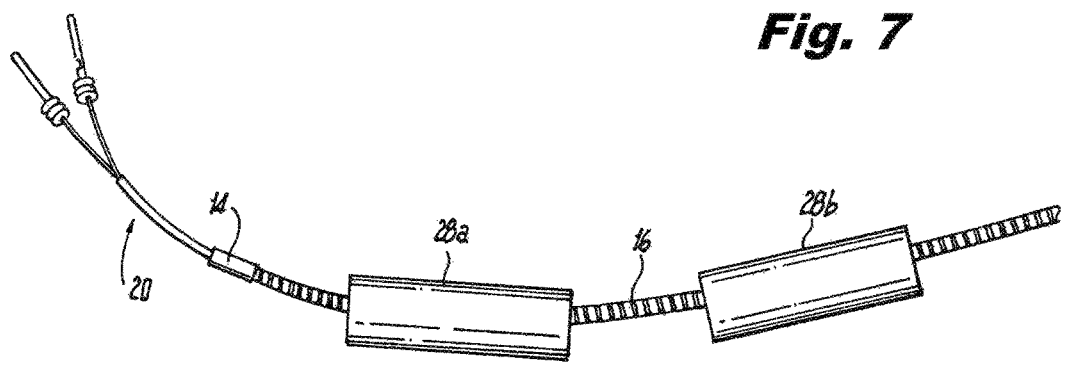
FIG. 7 depicts the initial position of two heat shrinkable terminal boots on the protective sheath with the thinner ends of the boots arranged toward one another.
Figure 8:
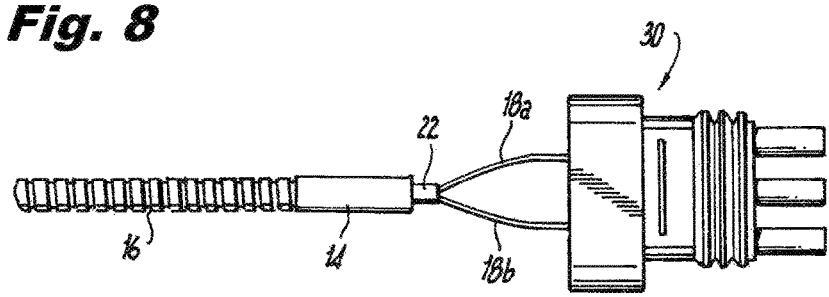
FIG. 8 shows the installation of a weather-pack terminal connector over the two terminal pins installed in FIG. 6.

After the terminal pins 26a, 26b and seals 24a, 24b have been installed on the ends of the core wires 18a, 18b of the linear detector cable 20, two heat shrinkable terminal boots 28a, 28b are placed onto the sheath 16, with the thinner ends thereof arranged toward one another, as shown in FIG. 7. Thereafter, the pinned core wires 18a, 18b are installed in a weather-pack shrouded terminal connector 30, as shown in FIG. 8. More particularly, a terminal connector 30 is installed at both end of the linear detector cable 20. The core wires 18a, 18b should be centered in the rear openings of the terminal connector 30.

Those skilled in the art will readily appreciate that the type of connector employed can vary depending up the application, and that the two connectors at the end of the assembly can be the same or different from one another. It should also be appreciated that the bending of the bifurcated core wires 18a, 18b can vary depending on the type of connector employed. It should also be appreciated that the two terminal boots can be positioned on the sheath 16 after one of the terminal connectors 30 has been installed. Thus, the order of the construction steps described herein can vary by choice or preference.

Figure 9:
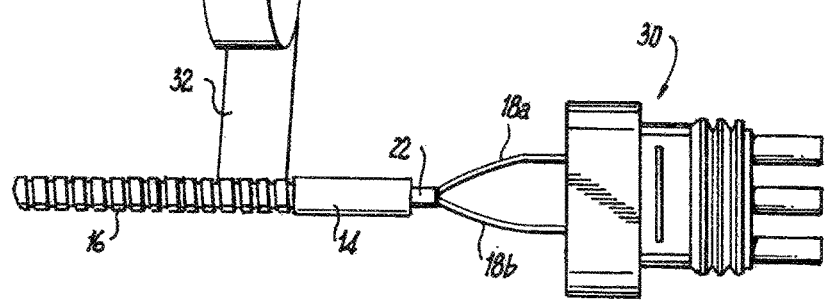
FIGS. 9 and 10 show the step of spirally wrapping heat resistant tape over a distal end portion of the outer protective sheath, the distal end portion of the tube and the two bifurcated core wires of linear detector cable, to define a transition area at each end of the cable.
Figure 10:
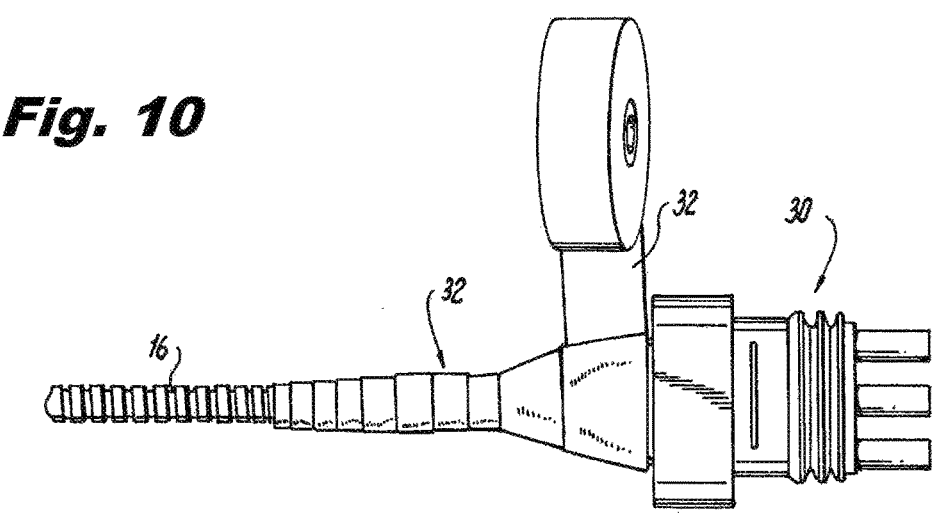

Then, as shown in FIGS. 9 and 10, starting with one full width, a layer of heat resistant tape 32 is spirally wrapped over each distal end portion of the outer protective sheath 16, proximal to the stop surfaces 14. The spiral wrapping continues over the stop surface 14, over the two bifurcated core wires 18*a*, 18*b* of linear detector cable 20, up to the back of the terminal connector 30. This defines a transition region 34 at each end of the cable assembly 10. The wires 18*a*, 18 should be maintained in a spread apart position when they are being wrapped, and the completion of the wrapping step, it should be verified that the core wires remain centered in the opening of the terminal connector 30.

Figure 11:
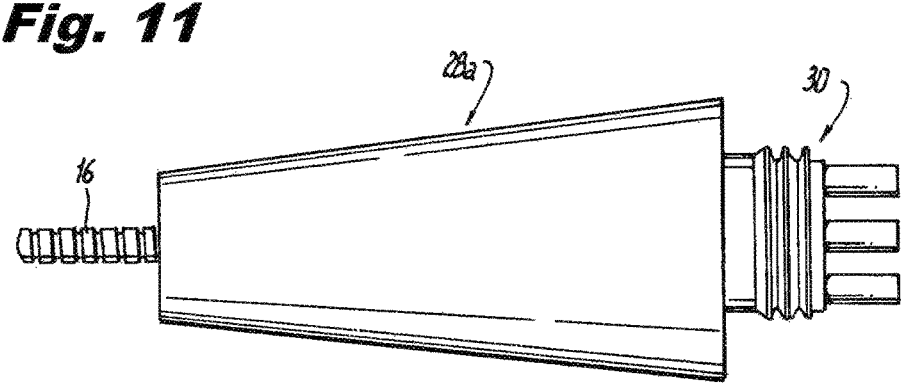
FIG. 11 shows the transition boot positioned over the transition area delineated by the spirally wrapped tape at each end of the assembly.
Figure 12:
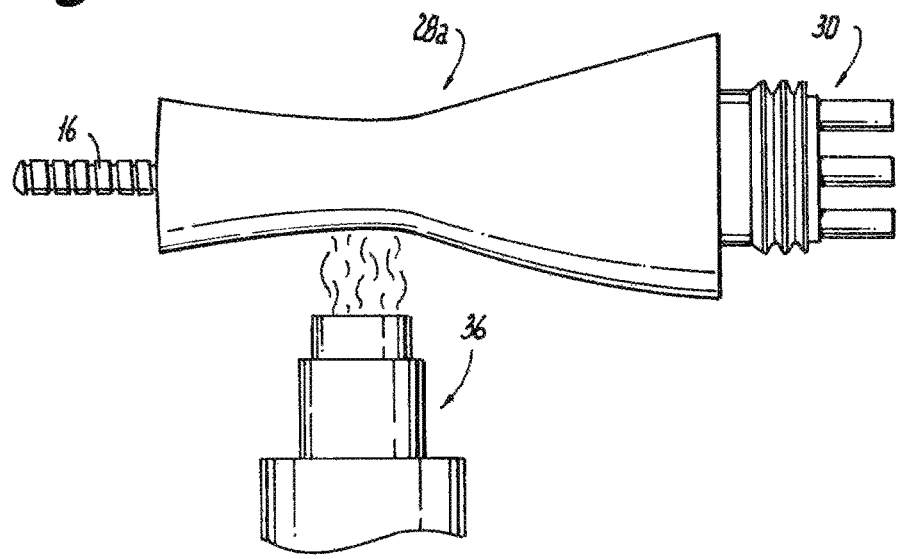
FIG. 12 illustrates the step of heat shrinking a transition boot over the transition region to encapsulate and protect the transition region.

A transition boot 28*a*, 28*b* is then positioned over the transition area 34 delineated by the spirally wrapped tape 32 at each end of the assembly 10, as shown in FIG. 11, with the larger end of the boot 28*a* sliding over the connector 30. Hot air from a heating device 36 is then directed at each transition boot 28*a*, 28*b* to shrink the boot over the transition region 34. This is preferably done by starting to direct heat in the area of the transition region and working back towards the connector end.

Importantly, the temperature of the air coming out of the heating device must be measure and adjusted so that the temperature of the heated air maintained in the range of 150° C. and 170° C. so as not to damage the heat sensitive polymer coating on the core wires 18*a*, 18*b* of the linear detection cable 20. Finally, the assembly is labeled at a location about 0.5 inches from the boot at one end of the cable assembly 10. The finished cable assembly 10 can then be wrapped into a coil configuration with loops of about 12 inches that can be secured together with black electrical tape.

It should be readily appreciated from the disclosure, that within the finished cable assembly 10, the PTFE tubing 12 at each end of the protective sheath serves as chaff protection between the core-wires 18*a*, 18*b* of the linear detector cable 20 and the outer protective sheath 16, particularly at the open ends of the protective sheath 16, where the edges are relatively sharp. Moreover, the PTFE tubing provides an assembly where there is not a direct bond between the protective sheath 16 and the linear detector cable 20. This will prevent the possibility of the detector cable 20 being damaged.

While the subject invention has been shown and described with reference to preferred embodiments and methods of construction, those skilled in the art will readily appreciate that various changes and/or modifications may be made thereto without departing from the spirit and scope of the subject invention as defined by the appended claims.

What is claimed is:

1. A method for preventing chaffing for a linear detector cable, comprising the steps of:
   a) preparing an elongated polymer tube having a predetermined length and outer diameter;
   b) wrapping heat resistant tape having a given width around a distal end portion of the polymer tube to locally enlarge the outer diameter of the tube; and
   c) inserting a proximal end portion of the polymer tube into an open end of a metallic protective sheath having a predetermined inner diameter that is slightly greater than or equal to the outer diameter of the tube, so that the heat resistant tape wrapped around the distal end portion of the tube abuts against the end of the protective sheath to act as a stop surface, ensuring proper positioning of the tube within the sheath, further comprising the step of feeding the linear detector cable into the protective sheath through the distal end portion of the polymer tube.

2. The method according to claim 1, further comprising the step of installing a terminal connector to an end portion of the linear detector cable extending from the distal end portion of the polymer tube.

3. The method according to claim 2, further comprising the step of spirally wrapping a layer of heat resistant tape over an end portion of the protective sheath, the distal end portion of the tube and the linear detector cable, up to the back of the terminal connector, to define a transition area.

4. The method according to claim 3, further comprising the step of positioning a transition boot over the transition area delineated by the spirally wrapped tape.

5. The method according to claim 4, further comprising the step of heat shrinking the transition boot over the transition area delineated by the spirally wrapped tape.

6. The method according to claim 3, wherein the step of wrapping heat resistant tape around a distal end portion of the polymer tube involves wrapping at least two layers of tape around the distal end of the tube.

7. The method according to claim 3, wherein the step of wrapping heat resistant tape around a distal end portion of the polymer tube involves wrapping tape having a width that is about one third of the length of the tube.

8. The method according to claim 3, wherein during spirally wrapping, a core wire of the linear detector cable remains centered in an opening of the terminal connector.

9. A method of constructing a sheathed linear detector cable with transition protection, comprising the steps of:
   a) providing an elongated metallic protective sheath having opposed open ends and a given inner diameter;
   b) providing a pair of elongated polymer tubes each having a given outer diameter that is slightly less than or equal to the inner diameter of the protective sheath;
   c) forming a stop surface on a distal end portion of each polymer tube; and
   d) positioning a proximal end portion of one of the polymer tubes into each open end of the protective sheath, so that the stop surface on the tube abuts against the end of the protective sheath to ensure proper positioning of that tube within the sheath.

10. The method according to claim 9, further comprising the step of feeding a linear detector cable into the protective sheath through the distal end portion of one of the polymer tubes.

11. The method according to claim 10, further comprising the step of installing a terminal connector to each of the end portions of the linear detector cable extending from the distal end portions of each of the polymer tubes.

12. The method according to claim 11, further comprising the step of spirally wrapping a layer of heat resistant tape over the end portion of the protective sheath, the distal end portion of the polymer tube and the portion of the linear detector cable extending from the tube, up to the back of the terminal connector, to define a transition area at each end of the protective sheath.

13. The method according to claim 12, further comprising the step of positioning transition boots over the transition areas delineated by the spirally wrapped tape at each end of the protective sheath.

14. The method according to claim 13, further comprising the step of heat shrinking the transition boots over the transition areas delineated by the spirally wrapped tape at each end of the protective sheath.

15. The method according to claim 12, wherein the step of forming a stop surface on a distal end portion of each polymer tube involves wrapping at least two layers of heat resistant tape having a width that is about one third of the length of the tube, around the distal end portion of each tube to locally enlarge the outer diameter of each tube.

16. The method according to claim 12, wherein during spirally wrapping, core wires of the linear detector cable remain centered in an opening of the terminal connector.

17. The method according to claim 12, wherein during spirally wrapping, core wires of the linear detector cable are maintained in a spread apart position when they are being wrapped.

* * * * *